United States Patent
Hwang

(10) Patent No.: US 8,926,221 B2
(45) Date of Patent: Jan. 6, 2015

(54) CONCURRENT DISPOSAL AND CONSOLIDATION OF DREDGED SEDIMENT USING HORIZONTAL DRAINS AND VACUUM LOADING

(76) Inventor: Daekyoo Hwang, West Chester, PA (US)

(*) Notice: Subject to any disclaimer, the term of this patent is extended or adjusted under 35 U.S.C. 154(b) by 60 days.

(21) Appl. No.: 13/294,989

(22) Filed: Nov. 11, 2011

(65) Prior Publication Data

US 2012/0057937 A1 Mar. 8, 2012

Related U.S. Application Data

(63) Continuation-in-part of application No. 12/368,054, filed on Feb. 9, 2009, now abandoned.

(51) Int. Cl.
| | | |
|---|---|---|
| *B09C 1/02* | (2006.01) | |
| *B09B 1/00* | (2006.01) | |
| *B09C 1/00* | (2006.01) | |
| *B09C 1/08* | (2006.01) | |
| *E02F 5/28* | (2006.01) | |

(52) U.S. Cl.
CPC . *B09B 1/006* (2013.01); *B09C 1/00* (2013.01); *B09C 1/02* (2013.01); *B09C 1/08* (2013.01); *E02F 5/28* (2013.01)
USPC .................. 405/129.57; 405/129.85

(58) Field of Classification Search
USPC ......... 405/117, 129.15, 129.2, 129.25, 129.3, 405/129.45, 129.57, 129.7, 129.85
See application file for complete search history.

(56) References Cited

U.S. PATENT DOCUMENTS

| | | | | |
|---|---|---|---|---|
| 4,541,752 | A * | 9/1985 | Phillips | 405/129.85 |
| 4,749,479 | A * | 6/1988 | Gray | 210/170.08 |
| 4,752,402 | A * | 6/1988 | Gray | 210/747.9 |
| 5,355,594 | A * | 10/1994 | Hwang | 34/356 |
| 5,857,807 | A * | 1/1999 | Longo, Sr. | 405/129.7 |
| 6,119,375 | A * | 9/2000 | Wilson et al. | 37/195 |
| 6,283,676 | B1 * | 9/2001 | Hater et al. | 405/129.57 |
| 6,364,572 | B1 * | 4/2002 | Hudgins et al. | 405/129.35 |
| 6,835,314 | B2 * | 12/2004 | Keller et al. | 210/710 |
| 7,264,713 | B2 * | 9/2007 | Kryzak | 210/167.01 |
| 2002/0150429 | A1 * | 10/2002 | Hull | 405/129.2 |
| 2006/0222463 | A1 * | 10/2006 | Subbarayan et al. | 405/129.85 |

* cited by examiner

*Primary Examiner* — Benjamin Fiorello
(74) *Attorney, Agent, or Firm* — Ryder, Lu, Mazzeo & Konieczny, LLC; Joseph M. Konieczny, Esq.

(57) ABSTRACT

A method and system for dewatering and consolidating contaminated dredged sediment concurrently as it is discharged to a disposal pond using horizontal drains installed in the settled sediment and vacuum loading. Horizontal drains are connected to a vacuum pump via collector hoses and a header pipe. Vacuum pump operation consolidates the settled sediment and reduces the volume, enabling continued discharge of dredged sediment. Successive installation of horizontal drains within accumulating sediment and consolidation by vacuum pumping may continue until the disposal pond is filled with consolidated sediment. Vacuum pumping is continued for some period after final cover installation to enhance containment performance by over-consolidation. The horizontal drain system may also be used to deliver liquid reagents for sediment treatment or to circulate water for flushing. The method enables the disposal pond to be on land or under water below the original sediment line.

26 Claims, 4 Drawing Sheets

FIG. 5.A
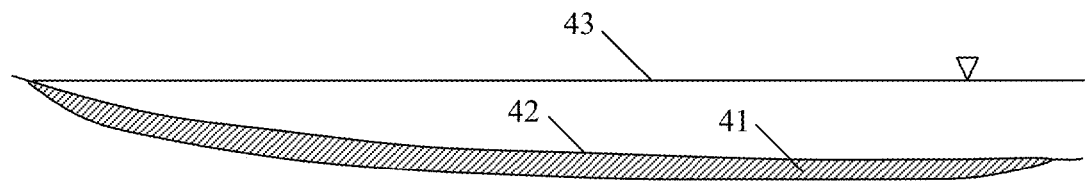
FIG. 5.B
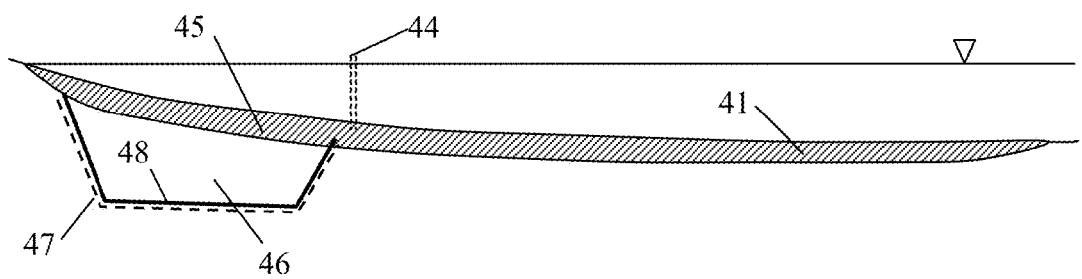
FIG. 5.C
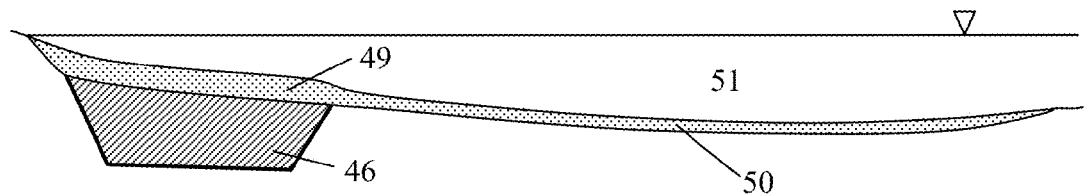

CONCURRENT DISPOSAL AND CONSOLIDATION OF DREDGED SEDIMENT USING HORIZONTAL DRAINS AND VACUUM LOADING

CROSS REFERENCE TO RELATED APPLICATIONS

The present invention is a continuation-in-part application and claims priority to U.S. patent application Ser. No. 12/368,054 filed Feb. 9, 2009 entitled Concurrent Disposal And Consolidation Of Dredged Sediment Using Horizontal Drains And Vacuum Loading

FIELD OF INVENTION

This invention relates to remediation of contaminated sediment by secure containment in a disposal facility and more specifically, a method and apparatus for consolidating dredged sediment or fluid earthen medium in a disposal facility to reduce its volume and to stabilize its physical properties.

BACKGROUND OF THE INVENTION

Past industrial activities have contaminated sediments in many streams, rivers, lakes, and harbors. The contaminated sediment requires remediation to mitigate its potential impact on ecological receptors, human health, or environmental media. An overview of sediment remediation options is provided below.

In-situ Capping—In-situ capping isolates contaminated sediment from the surrounding surface water body or ecological receptors by placing a protective cover over the contaminated sediment area.

In-Situ Treatment—In-situ treatment refers to treatment of the contaminated sediment at its current location without removal. The treatment methods include biological, chemical, and physical processes.

Removal—Removal is a necessary step for other remediation methods such as ex-situ treatment, off-site disposal or on-site disposal. The most common removal method is dredging. Excavation is also used if the sediment is under a shallow water body that may be drained temporarily using a simple and economical surface water barrier.

Ex-situ Treatment—In this approach, contaminated sediment is removed from its current location and treated. Ex-situ treatment methods include bioremediation, chemical treatment, soil washing, solidification/stabilization and others.

Off-site Disposal—Even after ex-situ treatment, the quality of treated sediment may not fully meet all regulatory requirements. In this case, the treated sediment is taken to an off-site disposal facility (sanitary, industrial or hazardous waste landfill) for safe disposal.

On-site Disposal—Contaminated sediment may be removed and contained, with or without treatment, in an engineered disposal facility built at the project site solely for disposal of the target sediment. The disposal facility filled with sediment is closed as a landfill. Therefore, sediment dewatering is essential. Two common dewatering methods are mechanical dewatering and geotube dewatering.

In mechanical dewatering, dredged sediment is pumped to a mechanical dewatering unit (e.g., a centrifuge, a belt press, or a filter press), dewatered, and cake is placed in the disposal facility. Often, the cake requires solidification/stabilization as cake from mechanical dewatering cannot support earthwork equipment used for disposal work.

Geotube dewatering uses geotubes for dewatering. Geotubes are large filter bags made of geotextile. Dredged sediment is pumped into a geotube and water is allowed to drain, leaving solids in the geotube. After the geotube is filled with pumped-in dredged sediment, the sediment is allowed to drain for some time. When the geotube collapses as water is drained, more dredged sediment is pumped into the geotube. After cycles of filling and draining, the geotube is filled with "drained" sediment. The drained sediment may be dewatered further, if desired, by evaporative drying for several weeks. The dewatered sediment may be taken off site for disposal. For on-site disposal, geotubes may be deployed within the disposal pond before they are filled.

Contained Aquatic Disposal—Contained aquatic disposal is underwater disposal and capping of dredged sediment in natural depressions, excavated pits or bermed areas at the bottom of water bodies. This method is often used for disposal of the sediment dredged from harbors and urban waterways where on-site disposal is not feasible due to limited land area. The disposal sites are selected from areas with a sufficient water depth (to avoid interruption of navigation) and low water energy (to avoid erosional loss of contained sediment).

Consolidation refers to a process of soft clayey soils subject to a load undergoing volume reduction and strength gain as a result of water being squeezed out of the loaded soil volume. As clayey soils do not allow water to flow out easily due to its very low hydraulic conductivity, drainage pathways are provided in the soil volume to accelerate consolidation. The most common way of providing drainage pathways is to insert wick drains vertically into the clay layer with a typical spacing of about 1.5 m. A wick drain is a long strip about 0.5 cm thick and 10 cm wide and consists of a plastic core wrapped with geotextile filter. Wick drains facilitate flow of water from soft clayey soils to the ground surface.

Accelerated consolidation with wick drains has been used for numerous construction projects on soft clayey soils. However, it has not been used for dewatering of dredged sediment in environmental remediation due to one critical limitation. As consolidation is a method of stabilizing a full layer of soft soil, it is applicable to dredged sediment after the disposal operation is completed. However, consolidation dewatering after filling a disposal pond with dredged sediment is not practical for the reasons described below.

To illustrate the point, suppose that consolidation dewatering is attempted for disposal of dredged sediment. Dredged sediment typically contains less than 10% solids by weight as it is pumped as a slurry. After settling in the disposal pond, its typical solids content is around 35% by weight, equivalent to 17% solids and 83% water by volume. As this is too soft to place a final cover for closure, the dredged sediment requires dewatering, in this case by consolidation. The pond surface has to be stabilized first by draining and natural drying to allow equipment access. This step takes very long. The subsequent steps of consolidation work include covering the surface with a geotextile, spreading 0.5 to 1.0 m of sand (top blanket drain) over the geotextile, installing vertical wick drains into the soft sediment with an installation rig working on the top blanket drain, and loading with thick earth fill. As this fill cannot be placed in one step on the very soft sediment, it has to be placed in small lifts, allowing time for consolidation and strength gain before applying the next lift. Thus, this loading step also takes a long time. A large settlement, typically about 50% to 70% of the initial thickness, occurs as a result of consolidation. The final step of pond closure would be surface grading and final cover installation. Surface grading requires the entire fill, or 50% to 70% of the thickness of the consolidated sediment in the disposal pond, to remain in the pond.

The steps described above signify three major problems in consolidation dewatering for on-site disposal of dredged sediment. First, these steps take too long, particularly in stabilizing the surface for equipment access and in applying the load in several lifts. Second, the capacity of the disposal pond is wasted by fill equivalent to 50 to 70% of the pond capacity. Third, the above two reasons make consolidation dewatering costly and impractical. For these reasons, consolidation dewatering is not viable for disposal of dredged sediment in environmental remediation, unless technical improvements are made. The above problems can be overcome if the sediment in the disposal pond is consolidated while dredged sediment is being discharged into the pond. Thus, it would be desirable to devise a method of consolidation dewatering concurrent with discharge of the dredged sediment into the disposal pond.

In achieving the goal stated above, vacuum loading will play a key role. Vacuum has been often utilized as a means of loading for consolidation projects. In this method, the ground surface is covered with an impermeable membrane and vacuum is applied to the underside of the membrane. This creates an effect of atmospheric pressure working as a load. Although vacuum consolidation offers some advantages, it is often troublesome due to incomplete seals along the edge of the membrane and its cost is significant. A Dutch firm COFRA (see COFRA webpage) practices a vacuum loading method that does not require membrane sealing by connecting the top of vertical wick drains with sealed vacuum lines within the soft clay layer, which is almost impermeable. The present invention intends to extend vacuum consolidation application to horizontal drains using self-sealing properties of fluid earthen medium which is the target for consolidation.

The Corps of Engineers performed a research project evaluating ways of stabilizing dredge spoils from navigation dredging and demonstrated that vacuum underdrainage is an effective way of stabilizing dredge spoil (Hammer, 1981). In this method, a layer of bottom blanket drain is installed in the disposal facility, dredge spoil is discharged, and a vacuum is applied to the bottom blanket drain.

SUMMARY OF THE INVENTION

A first embodiment of the invention provides a method of remediating a contamination site containing a total volume $V_T$ of contaminated sediment having more than 70% water by volume and less than 30% fine-grained solids by volume. In accordance with the method, a disposal pond is initially established near the contamination site. In one embodiment, the pond comprises a diked disposal pond with a capacity sufficient to contain the total post-consolidation volume of contaminated sediment and is at least 6 m deep.

A first volume portion $V_1$ of the contaminated sediment is dredged and discharged into the disposal pond as a slurry. The first volume portion $V_1$ is allowed to separate into a lower, settled solids portion and upper liquid portion.

After slurry separation, a plurality of parallel, coplanar horizontal drains are installed in the lower solids portion intermediate the bottom of the pond and the top of the solids portion, to form a first level of horizontal drains within the first layer of solids. The drains are preferably wick drains or tube drains. The first level of drains is preferably installed about 1.2 to 1.5 m above the bottom of the pond.

After installation of the first level of drains, the process of discharging additional volume portions $V_n$ into the pond and installing a successive level of drains is repeated until the total volume $V_T$ of the contaminated sediment is removed from the contamination site. Each successive level of horizontal drains is installed within the lower solids portion intermediate the horizontal top of the solids portion and the level of horizontal drains below it. The drains are preferably installed when the thickness of the solids portion is at least 2 to 2.4 m. In a preferred embodiment, the drains are installed with lateral spacing between each drain of about 1.2 to 1.8 m, initial vertical spacing between each level of about 1.8 to 3.0 m, and at least 0.5 m below the top surface of the solids portion. The drains of each vertically adjacent level may be offset laterally from one another. The drains are initially installed at vertically spaced locations considering solid consolidation and compression such that the final vertical spacing between drain levels after solids portion consolidation is about 0.9 to 1.2 m.

As each level of drains is installed, vacuum pressure is applied to each of said horizontal drains to extract water from the solids portion until the total volume $V_T$ of contaminated sediment is consolidated in the pond. Preferably, vacuum pressure is sequentially applied to and maintained on each drain level before the next successive drain level is installed.

The method of remediation preferably includes the step of closing the pond by draining the upper liquid portion from the uppermost solids portion, drying the uppermost solids portion, grading the solids portion to allow rainwater drainage away from the pond, and installing a final cover over the pond. In an embodiment, the contaminated sediment is over-consolidated by maintaining vacuum pressure on the drains after encapsulating the pond.

In a preferred embodiment, disturbance of the solids portion during drain installation is minimized by suspending the drain installation equipment and drain supply on or above the liquid portion and plowing the drains into the solids portion. In one embodiment, the drains are installed using a barge that floats on and traverses the pond. The barge includes a control cable and capstan winch to control movement of the barge. The barge also has a plurality of drain reels mounted on the barge, a plurality of feed rollers securing the horizontal drains, a plurality of drain guides guiding the horizontal drains from the feed rollers and inserting the drains into the settled sediment, a lift mechanism to move the drain guides vertically to release the horizontal drains at a desired depth, and an anchoring device to hold the beginning ends of horizontal drains in place while the barge moves backward to release said drains.

In another embodiment, the method of remediation includes the step of treating the consolidated, contaminated sediment in the pond by injecting a liquid reagent, clean water, or a cleaning solution into one level of horizontal drains and applying vacuum pressure to an adjacent level of horizontal drains to degrade, destroy, flush, or immobilize contaminants in the consolidated sediment.

In another embodiment of the invention, a method of remediating a submerged contamination site containing a total volume $V_T$ of contaminated sediment comprising water and fine-grained solids is provided. The method comprises the initial step of establishing a submerged pond near the contamination site by: installing a water barrier structure around an area, removing any water from the area; removing any contaminated sediment from the area and temporarily storing it outside the pond; excavating non-contaminated earthen materials to a volumetric capacity sufficient to contain the consolidated volume of the total volume of contaminated sediment and storing the excavated clean material separately out of the area for later use; and, installing a liner system in the interior of the area.

After the pond is established, contaminated sediment is dredged and transferred into the pond and consolidated using the same method as described above. The pond is then closed by covering the consolidated, contaminated sediment with a layer of excavated clean material.

In another embodiment, a system for dewatering and consolidating a total volume $V_T$ of sediment having a mixture of water and fine-grained solids is provided. The system comprises a disposal pond near the contamination site for containing the sediment, a plurality of coplanar drains arranged in parallel, vertically-spaced levels relative to the bottom of the pond, a vacuum pressure pump connected to each said drains, and a barge for traversing the pond and installing said drains in the sediment. The drains preferably comprise wick drains or tube drains having lateral spacing between each drain of about 1.2 to 1.8 m and initial vertical spacing between each level of about 1.8 to 3.0 m. In a preferred embodiment, the drains are connected to a collector hose using T-joints. The collector hoses are connected to a header pipe, which is connected to a vacuum pump.

A further embodiment of the invention provides a method of dewatering and consolidating a total volume $V_T$ of sediment in a submerged disposal pond. The method involves initially establishing a submerged disposal pond in or near the contamination site by installing a silt curtain enclosing a disposal area to minimize migration of suspended sediment out of the area; removing a sufficient volume of non-contaminated earthen materials from the area to create a volumetric capacity sufficient to contain the consolidated volume of the total contaminated sediment and storing the excavated clean material separately out of the area for later use; and, installing a submerged liner on the bottom of the area to minimize migration of contaminants after completion of sediment disposal and pond closure.

After the pond is established, contaminated sediment is dredged and transferred into the pond and consolidated using the same method as described above. The pond is then closed by covering the consolidated, contaminated sediment with a layer of excavated clean material.

In this embodiment of the invention, the method may include the steps of establishing the submerged disposal pond in the area of contaminated sediment and removing any contaminated sediment from the pond and temporarily storing it outside the pond prior to removing the non-contaminated earthen materials. If the disposal pond is established outside the contamination area, it is not necessary to initially remove the contaminated sediment. In both cases, it is not necessary to remove any water from the pond area.

In this embodiment, the liner is installed under water. Preferably, the liner comprises a bentonite mat, which can be placed in water with overlaps and which easily submerges to the bottom of the pond.

As sediment is dredged and pumped to a disposal pond as a slurry, sediment settles at the bottom. As settled sediment accumulates, a plurality of flexible drains are placed horizontally into the settled sediment and parallel to each other using a drain installation barge floating on the water surface. These drains are installed 1.2 to 1.8 m apart at the same depth, preferably 1.2 to 1.5 m above the bottom. Horizontal drains preferable for this application are wick drains used for accelerated consolidation of clayey soils or perforated, flexible tube drains wrapped with geotextile filter. Using T-joints, these drains are connected to a collector hose which in turn is connected to a header pipe leading to a vacuum pump. Operation of the vacuum pump extracts water from the settled sediment layer surrounding the horizontal drains and consolidates the settled sediment layer. Volume reduction resulting from this consolidation creates more disposal capacity in the disposal pond otherwise unavailable and allows continued discharge of dredged sediment into the disposal pond.

As the settled sediment builds up further above the consolidating layer in the disposal pond, another plurality of horizontal drains are installed at a new depth, preferably 1.8 to 3.0 m higher than the first depth of horizontal drains. Repeating this process of discharging dredged sediment and installing horizontal drains along with vacuum pumping operation allows continued dredging and discharge of sediment to fill the disposal pond with consolidated sediment. This method offers three advantages over the conventional method of complete disposal followed by consolidation using vertical wick drains (with or without vacuum): no waste of pond capacity for a large volume of fill, faster completion of the project, and project completion for a lower cost.

Upon completion of dredging and disposal operation, the surface of the disposal pond is graded with fill to achieve positive drainage and a final cover is installed to close the disposal pond as a landfill. After installing the final cover, vacuum pumping continues for some time to over-consolidate the consolidated sediment. Over-consolidation is an effective means of minimizing post-closure leachate generation and settlement of the final cover.

The present invention may be used to treat contaminated sediment in the disposal pond by injecting liquid reagents via the horizontal drains for bioremediation, chemical oxidation, or stabilization. Contaminants in the sediment may be flushed out by injecting clean water or a cleaning solution through a set of horizontal drains and extracting the same through another set of horizontal drains. This treatment step may be implemented either before or after final cover installation.

One effective use of the present invention is disposal of dredged sediment below the original sediment surface line, "subsediment" disposal. Sediment remediation often faces various obstacles such as limited land area making on-site disposal not possible or regulatory constraints making in-situ capping unacceptable. The regulatory constraints include no net fill in flood storage areas, no loss of water depth in navigable channels, and no loss of wetlands. While these obstacles often force costly off-site disposal, the present invention can overcome these obstacles by a drastic reduction of the sediment volume by consolidation and disposal below the original sediment surface line in near-shore water areas.

BRIEF DESCRIPTION OF THE DRAWINGS

FIG. 1A is a profile of a typical disposal pond built for disposal and containment of dredged sediment.

FIG. 1B is a profile of a disposal pond with dredged sediment being discharged.

FIG. 1C is a profile of a disposal pond as horizontal drains are placed in the settled sediment and connected to a vacuum pump.

FIG. 1D is a profile of a disposal pond with a plurality of horizontal drains placed at different depths and connected to a vacuum pump.

FIG. 1E is a cross-section of a preferred arrangement of multi-level horizontal drains to achieve an equilateral triangular pattern in the later stage of consolidation.

FIG. 1F is a profile of a disposal pond when sediment disposal is completed and a final cover is installed.

FIGS. 5A-C show steps of subsediment disposal wherein contaminated sediment is consolidated and contained in a disposal cell below the original sediment surface line.

DETAILED DESCRIPTION OF PREFERRED EMBODIMENTS

Figure 1A:
FIG. 1A through FIG. 1F disclose typical steps of implementing the present invention from start to finish.

For the purpose of illustration only, an embodiment of the invention is shown in the accompanying drawings. However, it should be understood by those of ordinary skill in the art that the invention is not limited to the precise arrangements and instrumentalities shown therein and described below. Throughout the specification, like reference numerals are used to designate like elements. Numerous changes and modifications within the spirit and scope of the invention will become apparent to those skilled in the art from this detailed description.

In a first embodiment of the invention, a method of consolidation dewatering for pond disposal of dredged sediment, concurrently as dredged sediment is discharged into the disposal pond, by horizontally installed drains and vacuum loading is provided. The method of the first embodiment is described below.

FIG. 1A through FIG. 1F disclose a preferred embodiment of the present invention from start to finish.

Referring to FIG. 1A, a disposal pond 11 is built to receive dredged sediment, often with a perimeter dike 12 and some excavation of the ground.

Figure 1B:
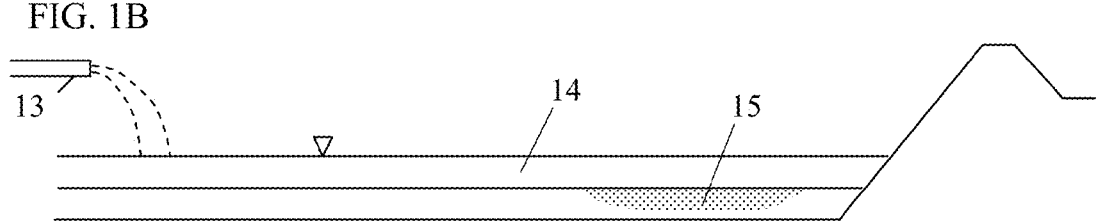

In FIG. 1B, dredged sediment 14 is discharged to disposal pond 11 via a discharge pipe 13. At this stage, the dredged sediment 14 is a slurry. As discharge of dredged sediment 14 continues, solids in dredged sediment 14 settle out at the bottom and the thickness of settled sediment 15 gradually increases.

Figure 1C:
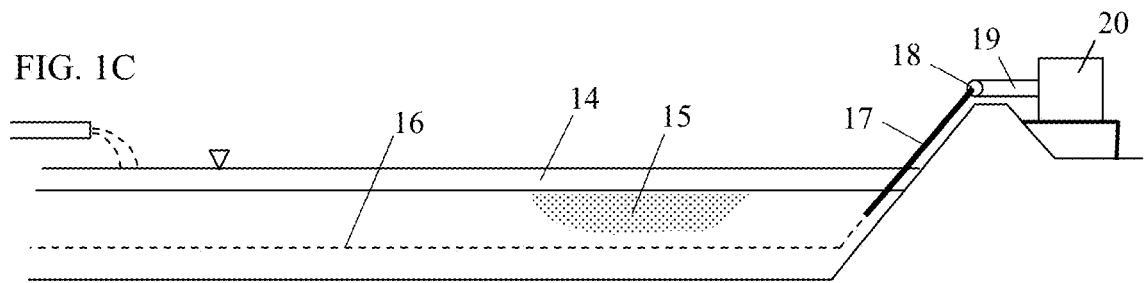
Figure 2:
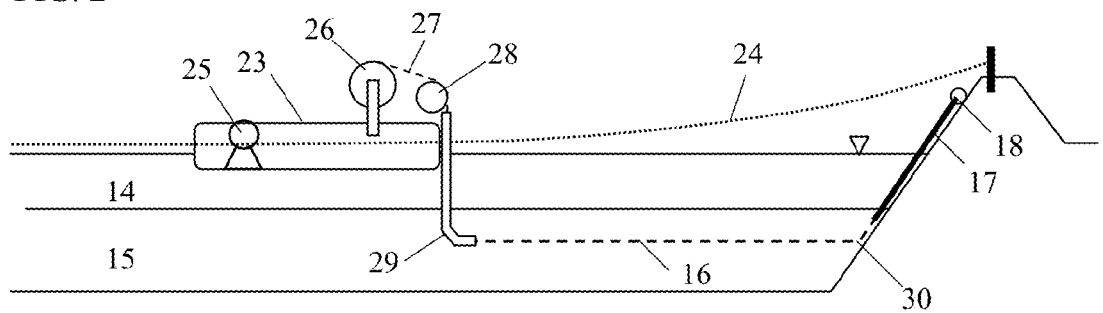
FIG. 2 is a schematic showing essential components of a floating craft used to install horizontal drains.

FIG. 1C shows the profile of disposal pond 11 when the first set of horizontal drains 16 is installed. When the thickness of settled sediment 15 is sufficient, i.e., at least 2 to 2.4 m, a plurality of horizontal drains 16 are installed at about 1.2 to 1.5 m above the bottom of disposal pond 11. Horizontal drains 16 are installed from a floating craft as depicted in FIG. 2. Preferably, horizontal drains 16 must be at least 0.5 m below the surface of settled sediment 15 to keep horizontal drains 16 from floating. Preferable horizontal drains are wick drains used for consolidation of soft clay soils or perforated, flexible tube drains wrapped with geotextile. Horizontal drains 16 are installed parallel to each other, at a distance of 1.2 to 1.8 m, depending on the hydraulic conductivity of settled sediment 15. Horizontal drains 16 are connected to a vacuum pump 20 via a T-joint 17, a collector hose 18, and a header pipe 19. Details of this embodiment are further depicted in FIG. 3.

The operation of vacuum pump 20 exerts suction along header pipe 19, collector hoses 18, and horizontal drains 16. This suction extracts water from the settled sediment 15 surrounding horizontal drains 16, leading to consolidation of settled sediment 15. As a result, the thickness of settled sediment 15 decreases and more capacity is created in disposal pond 11, allowing continued discharge of dredged sediment 14 into disposal pond 11.

Figure 1D:
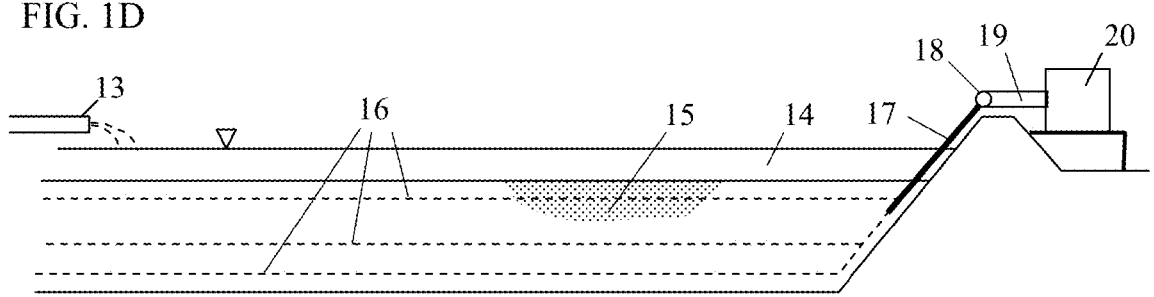
Figure 1E:
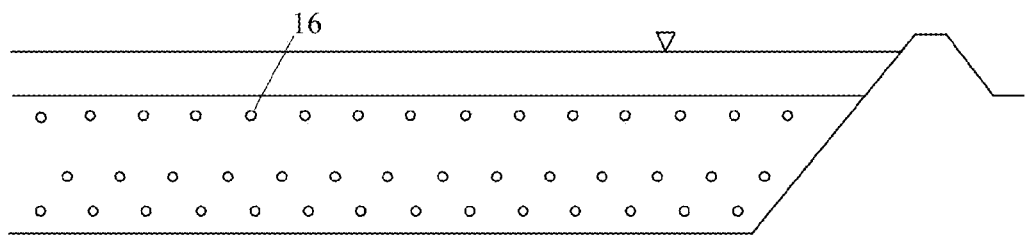

As continued discharge of dredged sediment 14 further increases the thickness of settled sediment 15, another set of horizontal drains 16 is installed, preferably about 1.8 to 3 m above the first set of horizontal drains, depending on the density of settled sediment 15 and expected final density after consolidation, as shown in FIG. 1D. FIG. 1E is a cross-section view of FIG. 1D, showing a preferred embodiment of horizontal drains 16 as an equilateral triangle. Because the vertical separation distance of horizontal drains 16 in FIG. 1E decreases over time due to on-going consolidation, the equilateral triangle can be formed only during a limited period of time. The preferred timing of forming the equilateral triangle is toward the later stage of consolidation wherein the rates of consolidation slow down.

Figure 1F:
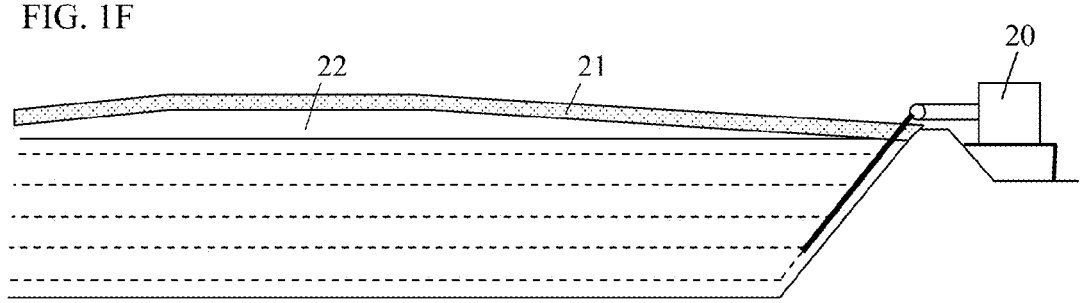

Continuing discharge of dredged sediment 14 and concurrent consolidation as described above will eventually fill disposal pond 11 with "consolidated sediment." Then, disposal pond 11 is closed as a landfill by installing a final cover 21 over the entire area as depicted in FIG. 1F. Prior to cover installation, the central area of disposal pond 11 may be raised with fill 22 to promote surface drainage.

FIG. 2 discloses a drain installation craft. The installation craft consists of a barge 23, a control cable 24, a capstan winch 25, a plurality of drain reels 26, a plurality of feed roller 28, and a plurality of drain guides 29. Drain 27 is unreeled from drain reel 26 and fed into drain guide 29 via feed roller 28. The installation craft moves typically straight backward using control cable 24 and capstan winch 25. First, drain 27 is inserted to the top of drain guide 29 and pulled out of the bottom end of drain guide 29. The guide and feed roller assembly is made to move vertically up and down to enable pulling of drain 27 from the bottom end of drain guide 29. Next, the end of drain 27 is joined to collector hose 18 using T-joint 17, as will be further described with FIG. 3. After connecting drain 27 with collector hose 18, drain 27 is anchored temporarily at a temporary anchoring point 30 using an anchoring device, preferably a trough-shaped weight, to keep drain 27 in place, and the installation craft moves backward using control cable 24 and capstan winch 25. As the craft moves, drain 27 is unreeled from the drain reel 26 and released from the bottom end of drain guide 29 into settled sediment 15. Settled sediment 15 is very soft at this stage and the depth of installation is only about 0.5 m from the surface of settled sediment 15. Therefore, the power requirement for the installation craft is not high. The installation craft is equipped with multiple drain reel-feed roller-drain guide sets to install multiple horizontal drains in one pass.

Figure 3:
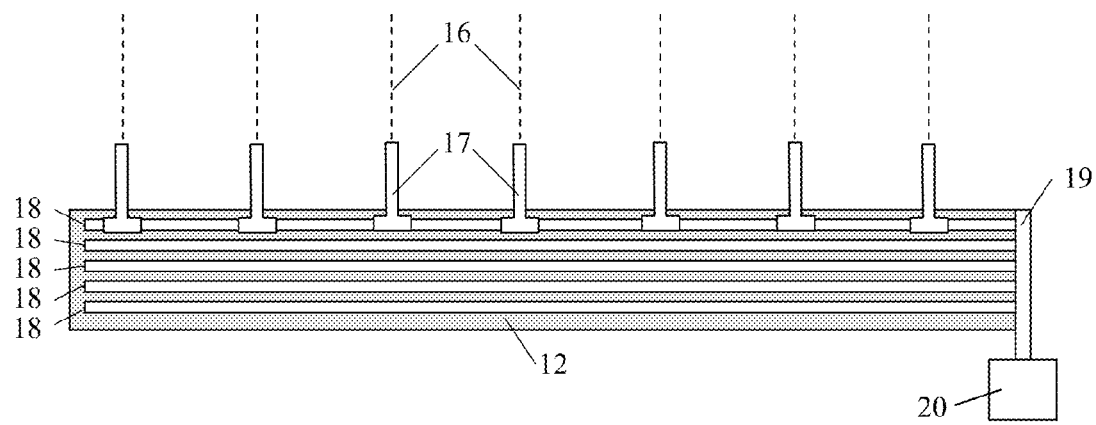
FIG. 3 is a plan view of a set of horizontal drains placed at a same depth and connected to a vacuum pump via T-joints, collector hoses and a header pipe.

Referring to FIG. 3, T-joint 17 connects horizontal drain 16 and collector hose 18. The one joint with collector hose 18 is above dredged sediment 15 as shown in FIG. 2 and therefore, must be connected air tight to maintain vacuum in collector hose 18. However, the joint with horizontal drain 16 does not require air-tight connection as this joint is embedded in settled sediment 15 that provides sealing against leakage of air at this joint. As a result, the present invention essentially uses the self-sealing property of settled sediment 15 to maintain vacuum pressure in horizontal drains 16. The use of this self-sealing property offers an economical and simple way of vacuum consolidation without sealing the entire surface area with a cumbersome and expensive liner. FIG. 3 shows multiple collector hoses 18, each connected to a plurality of horizontal drains 16, preferably from a particular depth. These collector hoses 18 need to be deployed neatly along perimeter dike 12.

A second embodiment of the present invention is to enhance containment performance by over-consolidation. Over-consolidation is a term referring to consolidation of soft clays under a load substantially exceeding the final load expected at the site. In this embodiment, vacuum pump 20 is operated for some time after final cover installation. Then, the entire sediment in disposal pond 11 is consolidated under the combined load of final cover 21, fill 22, and vacuum pressure. As this combined load forces the entire sediment to consolidate under a load larger than the final load consisting of final cover 21 and fill 22, the sediment is "over-consolidated." The advantage of over-consolidation is obvious; the over-consolidated sediment in disposal pond 11 will no longer release water (in this case, leachate) or settle further, after vacuum loading is removed.

Figure 4:
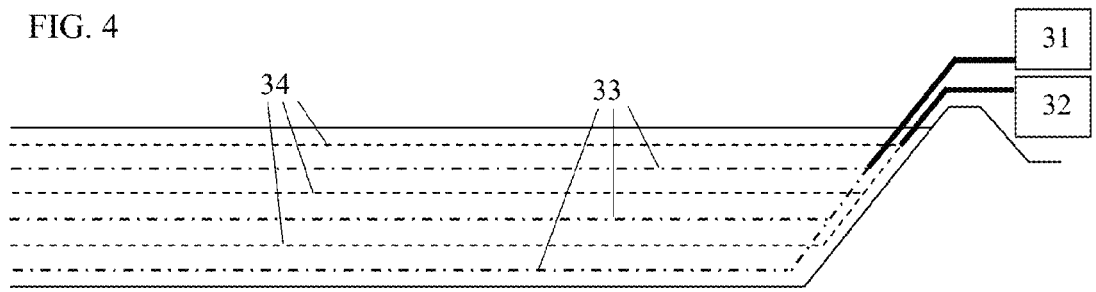
FIG. 4 is a profile of a disposal pond wherein alternating sets of horizontal drains are used for injection and extraction of treatment reagent.

A third embodiment of the present invention is in-situ treatment of sediment using the horizontal drains already in the sediment as a pathway to deliver liquid reagents. In general, the hardest problem with in-situ treatment of sediment is delivery of reagents uniformly into the target sediment volume due to the heterogeneity of in-situ sediment. With horizontal drains densely embedded in the sediment that has been substantially homogenized during dredging and pumping, it is now very simple to deliver treatment reagents in a liquid form using an injection pump. Various biological, chemical or physical reagents may be used for this purpose. FIG. 4 discloses this embodiment wherein an injection pump 31 injects reagents through a set of horizontal drains 33 and an extraction pump 32 extracts reagents through another set of horizontal drains 34. Injecting clean water or a cleaning solution and extracting the same in this embodiment can flush the contaminants from the sediment for subsequent ex-situ treatment of liquid.

A fourth embodiment of the present invention is "subsediment disposal," i.e., dredged sediment is consolidated and contained in a space created below the original sediment surface line. This embodiment is designed to overcome various site and regulatory constraints such as limited land area for on-site disposal; no net fill or no loss of navigation depth in in-situ capping; and no wetland encroachment in on-site disposal. By emplacing the target sediment volume into a less than 10% of the original area and below the original sediment surface line, the subsediment disposal method can overcome insurmountable obstacles often encountered in sediment remediation. The method and steps of subsediment disposal are depicted in FIG. 5.A, FIG. 5.B and FIG. 5.C.

FIG. 5.A shows a typical cross-section of a contaminated sediment site where contaminated sediment 41 is bounded by the sediment surface line 42 below the water surface 43. It is important to note that contaminated sediment 41 is in general thin and covers a large area, which makes subsediment disposal technically feasible.

FIG. 5.B depicts a typical cross-section of a subsediment disposal cell during the construction stage. First, a structure 44 is installed to enclose the disposal cell area. This structure 44 may be a silt curtain intended to minimize the dispersion of suspended sediment during construction, or a water barrier (e.g., a sheetpile wall, an earthen berm, or an inflatable membrane dam) intended to exclude the surface water. The next step is to remove the contaminated sediment 45 from the area enclosed by the structure 44 by dredging or by excavation, for temporary storage within an area isolated by a second structure like 44 within the area of the contaminated sediment 41. Then, the disposal cell 46 is excavated to the excavation line 47, again by dredging or with excavation equipment. After excavation of the disposal cell 46, the bottom liner 48 is installed (if the cell design calls for) to minimize contaminant migration from the disposal cell 46 after closure. The bottom liner 48, using a bentonite mat type liner, can be installed underwater without removing the water from the disposal cell 46. After the completion of the disposal cell 46, contaminated sediment 41 is dredged, placed in the disposal cell 46, and consolidated using this invention. The construction steps of FIG. 5.B will be much simpler, if disposal cell 46 is built outside the contaminated sediment area 41, because a second structure 44 and double handling of the contaminated sediment 45 are not required.

FIG. 5.C depicts a cross-section of the disposal cell 46 after subsediment disposal and closure of the cell. Now, the entire sediment volume 41 in FIG. 5.A is contained in the disposal cell 46 in FIG. 5.C. The clean soil excavated from disposal cell 46 is used for disposal cell cover 49 and for a buffer layer 50 where some residual contamination may be present. Two important facts should be noted from FIG. 5.C: the volume of the disposal cell 46 is typically between 30 and 45% of the original volume 41 and the area of the disposal cell 46 is typically from 5 to 10% of the original area 41. This drastic reduction in the sediment volume and area are illustrated below using the realistic sediment data found at contaminated sediment sites. Also shown are the typical ranges of the volume and area reduction possible by subsediment disposal.

Example—Reduction of Sediment Volume and Area by Subsediment Disposal

Typical in-situ solids content of fine-grained sediments (silts and clays) 35% by weight Typical specific gravity of fine-grained sediments (with some organics) 2.5

Take 1.0 kg of in-situ sediment (0.35 kg of solids and 0.65 kg of water)

Volume of solids 0.35/2.5=0.14 liter (L), water=0.65 L, and total=0.79 L

After consolidation using this invention, the typical volume ratio will be 50% solids and 50% water. Thus, the final volume of this sediment will be 0.14 L solids and 0.14 L water, totaling 0.28 L, only 35% of the original in-situ volume of 0.79 L.

The average thickness of the in-situ sediment is typically 2 to 4 feet. For a disposal cell excavation depth 5 times the in-situ average thickness, the area required for the disposal cell may be calculated as follows:

$$\text{From } V_D = 0.35 \times V_O \rightarrow A_D \times (5 \times T_O) = 0.35 \times (A_O \times T_O)$$

$A_D = 0.07\ A_O$ (area of disposal cell is 7% of the in-situ sediment area)

Where $V_D$=disposal cell volume $V_O$=in-situ sediment volume $A_D$=disposal cell area $A_O$=in-situ sediment area $T_O$=average thickness of in-situ sediment Thus, an in-situ sediment volume of, for example, 50,000 m$^3$ (50,000 m$^2$×1 m) may be contained in a disposal cell with a capacity of 17,500 m$^3$ (35% of the in-situ sediment volume) and built in an area of 3,500 m$^2$ (7% of the in-situ sediment area).

Depending on the in-situ sediment properties and consolidation load that may include a thick cap, the final volume of the disposal cell may range from 30 to 45% of the in-situ volume. Depending on the average thickness of the in-situ sediment and the cell excavation depth, the disposal cell area may be between 5 and 10% of the in-situ sediment area.

The above example signifies the remarkable effects of subsediment disposal. The total volume of the original sediment 41 (e.g., 50,000 m$^3$) in FIG. 5.A is now in the disposal cell 46 (17,500 m$^3$ capacity) in FIG. 5.C. The excavated material (17,500 m$^3$) from the disposal cell 46 is now spread over the area of the original sediment 41, taking a space below the original sediment surface line 42. As a result, the flood storage capacity and the navigation depth in the water body 51 in FIG.

5.C have increased, to solve the issues of net fill and navigation depth. Therefore, subsediment disposal makes on-site sediment disposal feasible even if no land area is available. As the disposal cell 46 is fully below the original sediment surface line 42, this embodiment may be used for sediment disposal in wetland areas as well, by building a disposal cell in the subsurface of the wetland and restoring the wetland after sediment disposal. It is important to note that subsediment disposal offers several advantages over in-situ capping often used for sediment remediation projects: the final cap area is 5 to 10% of the in-situ cap area, cap and buffer materials are available from cell excavation, containment performance is enhanced by over-consolidation and deeper emplacement, and maintenance need is far less for the above reasons.

It is to be understood that the description, specific examples and data, while indicating exemplary embodiments, are given by way of illustration and are not intended to limit the present invention. Various changes and modifications within the present invention will become apparent to the skilled artisan from the discussion, disclosure and data contained herein, and thus are considered part of the invention.

The invention claimed is:

1. A method of remediating a contamination site by consolidation and containment in a disposal pond, said contamination site having a total initial in-situ volume $V_T$ of contaminated sediment comprising water and fine-grained solids, comprising the steps of:
   a. establishing a disposal pond near the contamination site;
   b. dredging the contamination site and discharging a first volume portion $V_1$ of the contaminated sediment into said disposal pond as a slurry;
   c. allowing the first volume portion $V_1$ of slurry to settle and form a lower, settled solids layer and upper water layer;
   d. installing a plurality of parallel, coplanar horizontal drains within the lower solids layer to form a first level of horizontal drains within the first solids layer;
   e. applying vacuum pressure to all horizontal drains to extract water from the lower solids layer and to consolidate the lower solids layer;
   f. sequentially repeating steps b-e with a plurality of additional volume portions $V_N$ of slurry until the total volume $V_T$ of the contaminated sediment is discharged to, contained in, and consolidated in the disposal pond, wherein each successive level of horizontal drains is installed within each successive solids layer and consolidates each successive solids layer by vacuum loading; and,
   wherein at least one solids layer in the disposal pond is consolidated before the total volume $V_T$ of sediment is dredged and discharged from the contamination site to the disposal pond.

2. The method of remediation recited in claim 1, wherein step (e) comprises installing the horizontal drains with lateral spacing between each drain about 1.2 to 1.8 m apart, initial vertical spacing between each level of about 1.8 to 3.0 m, and at least 0.5 m below the top surface of the solids layer.

3. The method of remediation recited in claim 2, wherein step (e) comprises installing the horizontal drains when the thickness of the solids layer is at least 2 to 2.4 m.

4. The method of remediation recited in claim 3, wherein step (d) comprises installing the first level of horizontal drains about 0.6 to 1.5 m above the bottom of the pond.

5. The method of remediation recited in claim 2, wherein the drains are initially installed at vertically spaced locations such that the final vertical spacing between drain levels after solids layer consolidation is about 0.9 to 1.2 m.

6. The method of remediation recited in claim 1, including the step of closing the pond by draining the upper water layer above the uppermost solids layer, drying the uppermost solids layer, grading the surface of the uppermost solids layer to allow rainwater to drain toward the edge of the pond, and installing a final cover over the pond.

7. The method of remediation recited in claim 6, including the step of overconsolidating the contaminated sediment by maintaining vacuum pressure on the drains after installing the final cover.

8. The method of remediation recited in claim 1, including applying a common vacuum pressure source to each drain.

9. The method of remediation recited in claim 1, wherein vacuum pressure is sequentially applied to and maintained on a particular drain only until the solids layer that surrounds that particular level is consolidated.

10. The method of remediation recited in claim 1, wherein the drains of each vertically adjacent level are offset laterally from one another.

11. The method of remediation recited in claim 1, including the step of minimizing disturbance of the settled solids layer during drain installation by suspending the drain supply on or above the water layer surface and plowing the drains into the settled solids layer.

12. The method of remediation recited in claim 1, including the step of treating the consolidated, contaminated sediment in the pond by injecting a liquid reagent, clean water, or a cleaning solution into one level of horizontal drains and extracting the same from an adjacent level of horizontal drains to degrade, destroy, flush, or immobilize contaminants in the consolidated sediment.

13. A method of remediating a contamination site by consolidation and containment in a disposal pond, said contamination site having a total initial in-situ volume $V_T$ of contaminated sediment a mixture of water and fine-grained solids, comprising the steps of:
   a. establishing a disposal pond by;
      i) installing a water barrier structure around an area;
      ii) removing any surface water from the area;
      iii) removing any contaminated sediment from the area and temporarily storing it outside the pond area;
      iv) removing a sufficient volume of non-contaminated earthen materials from the pond area to create a volumetric capacity sufficient to contain the consolidated volume of the total contaminated sediment and storing the excavated clean material separately out of the pond area for later use; and,
      v) installing a liner system in the interior of the pond area;
   b. dredging the contamination site and discharging a first volume portion $V_1$ of the contaminated sediment into the disposal pond as a slurry;
   c. allowing the first volume portion $V_1$ of slurry to settle and form a lower, settled solids layer and upper water layer;
   d. installing a plurality of parallel, coplanar horizontal drains within the lower solids layer to form a first level of horizontal drains within the first solids;
   e. applying vacuum pressure to all horizontal drains to extract water from the lower solids layer and to consolidate the lower solids layer;
   f. sequentially repeating steps b-e with a plurality of additional volume portions $V_N$ of slurry until the total volume $V_T$ of the contaminated sediment is discharged to, contained in and consolidated in the disposal pond, wherein each successive level of horizontal drains is installed within each successive solids layer and consolidates each successive solids layer by vacuum loading;

wherein at least one solids layer in the disposal pond is consolidated before the total volume $V_T$ of sediment is dredged and discharged from the contamination site to the disposal pond.

14. The method recited in claim 13, including the step of over consolidating the contaminated sediment by maintaining vacuum pressure on the drains after installing the final cover.

15. The method of remediation recited in claim 13, including the step of treating the consolidated, contaminated sediment in the pond by injecting a liquid reagent, clean water, or a cleaning solution into one level of horizontal drains and extracting the same from an adjacent level of horizontal drains to degrade, destroy, flush, or immobilize contaminants in the consolidated sediment.

16. A system for dewatering and consolidating a contamination site having a total initial in-situ volume $V_T$ of contaminated sediment comprising water and fine-grained solids, comprising:
   a. a disposal pond near the contamination site;
   b. a plurality of coplanar drains arranged in parallel, vertically-spaced levels relative to the bottom of the pond,
   c. a vacuum pressure source connected to each of said drains; and,
   d. a barge for traversing the pond and installing said drains in the sediment, said barge including a control cable and capstan winch to control movement of said barge, a plurality of drain reels mounted on said barge, a plurality of feed rollers securing the horizontal drains, a plurality of drain guides guiding and inserting the horizontal drains from said feed rollers into settled sediment, a lift mechanism to move the drain guides vertically to release the horizontal drains at a desired depth, and an anchoring device to hold the beginning ends of horizontal drains in place while said barge moves backward to release said drains.

17. The system recited in claim 16, said drains comprising wick drains or tube drains having lateral spacing between each drain of about 1.2 to 1.8 m and initial vertical spacing between each level of about 1.8 to 3.0 m.

18. The system recited in claim 17, said drains being connected to a collector hose using T-joints, said collector hoses being connected to a header pipe that is connected to a vacuum pump.

19. A method of dewatering and consolidating in a disposal pond a total volume $V_T$ of contaminated sediment at a contamination site, said sediment comprising a mixture of water and fine-grained solids, comprising the steps of:
   a. establishing a disposal pond near the site of the sediment;
   b. transferring a first volume portion $V_1$ of the sediment from the site to the disposal pond as a slurry;
   c. allowing the first volume portion $V_1$ of slurry to separate and form a lower, settled solid layer and upper water layer;
   d. installing a plurality of parallel, coplanar horizontal drains within the lower solids layer to form a first level of horizontal drains within the first solids layer;
   e. applying vacuum pressure to all first level horizontal drains to extract water from the lower solids layer and to consolidate the lower solids layer;
   f. sequentially repeating steps b-e to a plurality of additional volume portions $V_N$ of slurry until the total volume $V_T$ of contaminated sediment is transferred to the pond, wherein each successive level of horizontal drains is installed within the lower solids layer;

wherein at least one solids layer in the disposal pond is consolidated before the total volume $V_T$ of sediment is transferred from the contamination site to the pond.

20. The method recited in claim 19, including the steps of lining the interior of the pond with a low permeability liner and closing the pond with a low permeability final cover to prevent migration of contaminants after closure of the pond.

21. The method recited in claim 19, wherein vacuum pressure is sequentially applied to and maintained on a particular drain only until the solids layer that surrounds that particular level is consolidated.

22. A method of dewatering and consolidating in a submerged disposal pond a total initial in-situ volume $V_T$ of contaminated sediment at a contamination site, said sediment comprising a mixture of water and fine-grained solids, comprising the steps of:
   a. establishing a submerged disposal pond near the site by:
      i) installing a silt curtain area near or within the contaminated sediment site;
      ii) removing a sufficient volume of non-contaminated earthen materials from the pond area to create a volumetric capacity sufficient to contain the consolidated volume of the total contaminated sediment and storing the excavated non-contaminated material separately out of the pond area for later use; and,
      iii) installing a liner system in the interior of the submerged pond using a liner that sinks in water;
   b. dredging and discharging a first volume portion $V_1$ of the contaminated sediment into the pond as a slurry;
   c. allowing the first volume portion $V_1$ of the slurry to settle and form a lower, settled solids layer and upper water layer;
   d. installing a plurality of parallel, coplanar horizontal drains within the lower solids layer to form a first level of horizontal drains within the first solids layer;
   e. applying vacuum pressure to the horizontal drains to extract water from the lower sediment layer and to consolidate the lower sediment layer;
   f. sequentially repeating steps b-e with a plurality of additional volume portions $V_N$ until the total volume $V_T$ of the contaminated sediment is contained and consolidated in the submerged disposal pond, wherein each successive level of horizontal drains is installed within each successive sediment layer and consolidates each successive sediment layer by vacuum loading;
   g. closing the pond by covering the consolidated, contaminated sediment in the submerged disposal pond with a final cover including a layer of excavated clean material;
   wherein the surface of the final cover is below the original sediment surface; and,
   wherein at least one solids layer in the disposal pond is consolidated before the total volume $V_T$ of sediment is dredged and discharged from the contamination site to the disposal pond.

23. The method recited in claim 22, including the step of establishing the submerged disposal pond in the area of contaminated sediment and removing any contaminated sediment from the pond and temporarily storing it outside the pond prior to removing the contaminated earthen materials.

24. The method recited in claim 22, including the step of installing a bentonite mat liner underwater.

25. The method of remediation recited in claim 22, including the step of overconsolidating the contaminated sediment by maintaining vacuum pressure on the drains after installing the final cover.

26. The method of remediation recited in claim 22, including the step of treating the consolidated, contaminated sediment in the pond by injecting a liquid reagent, clean water, or a cleaning solution into one level of horizontal drains and extracting the same from an adjacent level of horizontal drains to degrade, destroy, flush, or immobilize contaminants in the consolidated sediment.

* * * * *